Inventor
Erich Mittelsteiner
By B. Linger, atty

May 17, 1932. E. MITTELSTEINER 1,858,409
PROCESS FOR MEASURING WATER CONTENTS
Filed Dec. 28, 1929    2 Sheets-Sheet 2

Inventor
Erich Mittelsteiner
By B. Singer, atty

Patented May 17, 1932

1,858,409

UNITED STATES PATENT OFFICE

ERICH MITTELSTEINER, OF WELZOW, GERMANY

PROCESS FOR MEASURING WATER CONTENTS

Application filed December 28, 1929, Serial No. 417,154, and in Germany December 19, 1927.

In usual processes for finding out the water content of solid or liquid bodies the material to be tested is dried by heat, and the weight lost by evaporation of water is measured. This process needs long time, in most cases several hours.

The invention consists in heating a measured quantity of the test material, for example coal, in a gas-tight chamber at a certain constant temperature, and in measuring after a certain time the arising augmentation of the gas volume by aid of measuring devices as a manometer or also a device for measuring volumes at essentially constant pressure. This method furnishes a very precise result, as already in a few minutes an equilibrium between the evaporated water and the water remaining in the test material arises, and the partial pressure of the steam augments the gas or air pressure in the chamber precisely proportionately to the entire water content. Thus, in five to seven minutes the complete test is effected.

Some further details of the new process and of the apparatus serving for it are described below.

The invention is illustrated in the drawings in which

Figure 1:
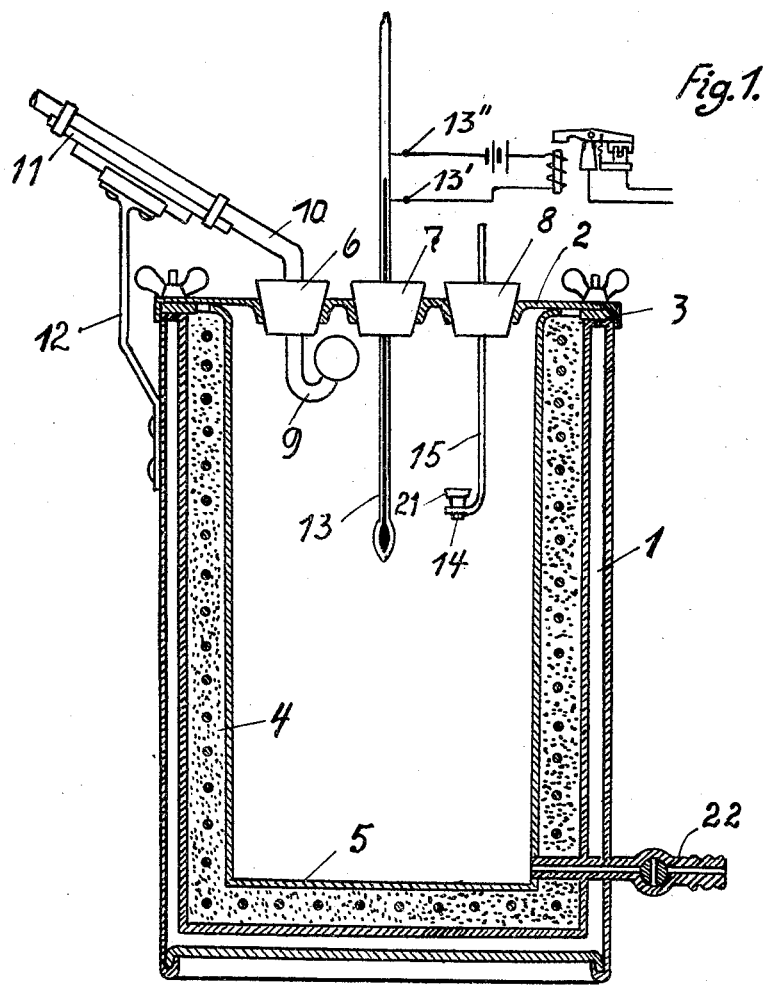
Fig. 1 is a section of a measuring vessel.

A double walled measuring vessel 1 constructed as a heat insulated vessel with preferably evacuated hollow walls is adapted to be airtightly closed by a cover 2 held by screws and tightened by a packing ring 3. In its interior, said vessel 1 contains an electrical heating resistance 4 and a protecting wall 5. Rubber stoppers 6, 7 and 8 serve for tightly introducing through the cover the following measuring instruments. A mercury barometer 9 extends outward through the stopper 6 with an inclined outer part 10 having a scale 11 which in consequence of the inclination allows of precise measuring and is longitudinally adjustable to a zero point. A supporting arm 12 fastened to the vessel 1 holds the scale and the barometer. In the second stopper 7, a thermometer 13 is inserted. In the third stopper 8, a container 14 for the test material is inserted by aid of a support 15.

For effecting the measurement, the vessel is heated to a certain temperature, the barometer is adjusted to zero and the test material is introduced. Thereafter, as soon as an approximate permanence arises, on the barometer 10, 11 the measure is read off, and herefrom the water content is reckoned, or in case that the barometer is gauged for the temperature, the vessel volume and other influences, the water content is immediately read off.

Figure 2:
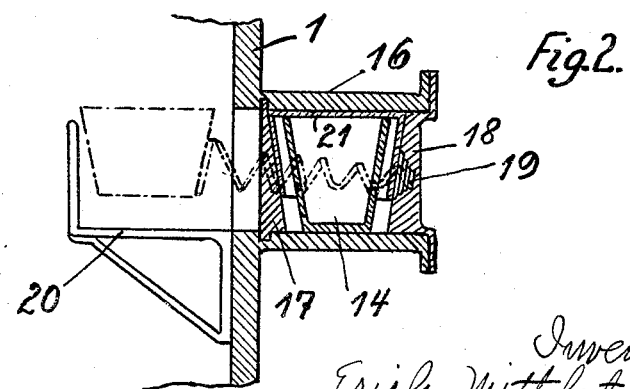
Fig. 2 is a view of a device for introducing the test material.

According to Fig. 2, for working with augmented pressure or with vacuum a sluice lock is provided (instead of the stopper 8) for introducing the test material. The vessel 1 (shown for simplicity with only one wall) has for this purpose a lock channel 16 which on both ends is adapted to be airtightly closed by locks 17, 18. The outer lock 18 formed as a cover has a spiral spring 19, and inside the vessel a table 20 is so arranged that the test container is pushed by said spring onto said table, as soon as the inner slide lock 17 is opened. If necessary, during the test the slide 17 can be closed, the spring 19 in this case being retracted by a tension wire.

The cover 21 of the test container 14 is so deep that mercury filled into the vessel 1 can not penetrate to the test material. Such an introduction of mercury can be used for expelling the entire air from the vessel and afterwards lowering the mercury level (by aid of a usual flexible tube pumping means) and thus producing any desired vacuum in the vessel, if the test is to be made under vacuum. A valve and tube attachment 22 serves for attaching a vacuum or pressure pump for such purposes and for tests under elevated pressure.

Figure 3:
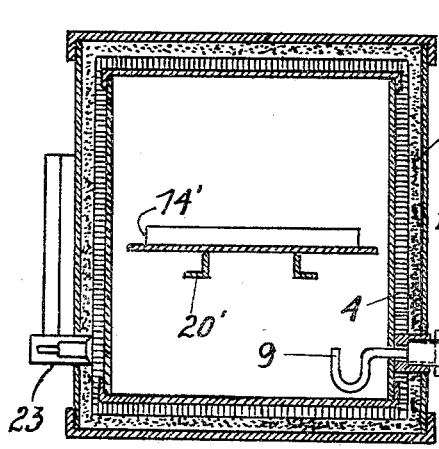
Figs. 3 to 5 are sections on three planes at right angles to each other of another measuring vessel.
Figure 4:
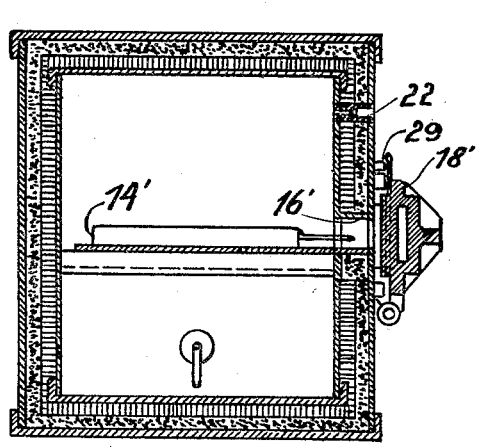
Figure 5:
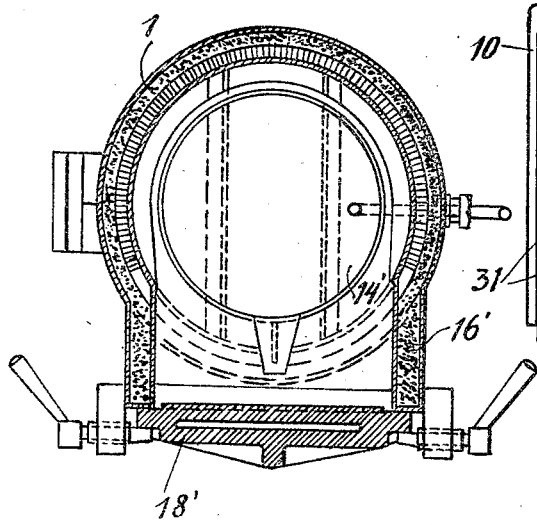

In the constructional form shown in Figs. 3 to 5 all essential parts are the same as in the first form, but all parts are adapted to the use of higher temperatures and pressures.

A vessel 1 insulated against heat transmission is again provided with heating resistances 4, and on the walls the barometer 9, 10 with its scale and other accessories are arranged. A connection 22 serves for exhausting the air and for evacuating or producing elevated pressure.

Inside the vessel a support 20' is arranged for supporting the test container 14' which in this case is formed as a flat vat containing the test material with a large free surface. An introducing opening 16' for the test container is in this case airtightly closed by a simple door 18'. A thermometer is arranged on any adapted spot, and especially a thermoelectric pile can serve for measuring the temperature. A contact device 23 may contain the current connections for the heating resistance 4 and for a thermo pile enclosed in the construction.

Figure 6:
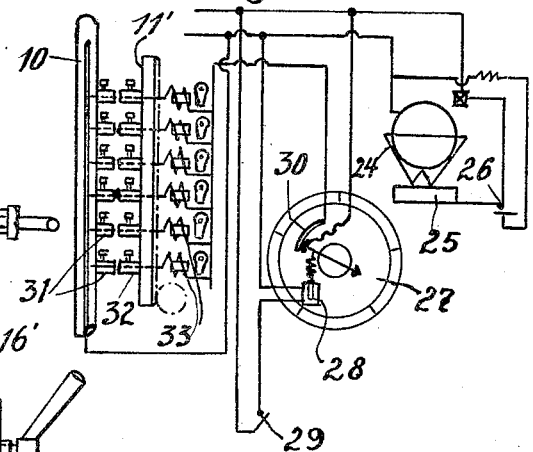
Fig. 6 is an electrical switch diagram, appertaining thereto.

According to Fig. 6, this apparatus is adapted to operate automatically.

A preferably electrically driven mill 24 serves for milling the test material. The receiving container 25 of said mill is supported on a balance having an electric contact 26 for stopping the mill as soon as the desired weight of test material is milled. Thus at every time freshly milled test material is available in a measured quantity.

A watch 27 is so arranged that its watch hand effects one revolution in a certain testing time which for example may be five minutes. A solenoid 28, fed with current by a contact 29, serves for automatically winding up and starting said watch. Said contact 29 is arranged on the measuring vessel near the introducing closure 18' in such way that it is closed by closing said closure, so that thereby the watch is wound up and started. In a corresponding manner also the end of the measurement is automatically fixed by the watch closing a further contact 30 serving for electrically signing the barometer measurements and finishing them. The barometer 10, for this purpose, contains contacts 31, molten in its glass tube and being brought into connection one after the other with a current source by the mercury column and signifying each for example one percent more of water content in the test material. An adjustable part 11' has contacts 32 opposed to said first contacts 31 in such way that its lowest contact may be adjusted to different heights of the barometer corresponding to the zero point, as above described in connection with the adjustable scale. The contact parts 32 are connected to signaling electromagnet coils 33 and further to the watch contact 30. Said signaling coils 33 serve to move signaling tables in the same way as known in household clock signaling tables.

The operation is as follows. From the receiving container 25 of the mill 24 the automatically filled test container 14' is removed and introduced into the vessel 1, whereupon a new container is introduced into the mill and again automatically filled until the mill automatically stops. By closing the closure 18' behind the introduced container, the contact 29 winds up and starts the watch 27, and the evaporation begins in the vessel which is continuously heated to a constant temperature. If pressure, for example up to two atm. abs. is to be used, such pressure is instantly produced by introducing compressed air through the connection 22, and the barometer scale 11' is adjusted to the zero point. During the evaporation the barometer then ascends, and each position is shown by the magnets 33 in which current is closed at the measuring times by the watch contact 30, until the measuring time has been finished and the watch 27 opens the current. No further operation is then to be effected, but at any desired time the whole measurement can be read off on the tables shown by the magnets 33, and thereafter all parts may be newly brought into beginning position and a new test performed.

The best results can be attained, if the heating temperature is chosen so high with respect to the pressure chosen, that the evaporated water becomes superheated steam, as in this case the partial pressures of air and steam are the most precisely readable and the measurement is accelerated. Vacuum is advantageously used, if very small water contents are to be investigated or the temperature may only be low with regard to the danger of self-ignition. Elevated pressures are used for effecting precise measurements.

A great surface of the testing material accelerates the evaporation up to the state of permanence.

In practice it has been proven that a measuring time of only four minutes in all cases furnishes a result of more preciseness than usually prescribed, and in most cases even three minutes furnish a result lying within the prescribed limits of preciseness.

The barometer 10 can be replaced by any desired manometer, for example of the commonly known type having a diaphragm formed as a capsule or a tube and an indicating hand moved by this device. In this case no adjustment to a zero point is necessary for tests made under atmospheric pressure, as no vacuum (as in barometers) exists, but the pressure differences are immediately read off.

The thermometer can be replaced or completed by a thermo-regulator of any commonly known type, in which electrical contacts are governed so as to automatically maintain the desired constant temperature. For this purpose, in Fig. 1 contacts 13' and 13" are molten in the thermometer 13, and as soon as the mercury reaches the upper contact 13″ it causes an electrical current to pass a relay and switch out the heating current.

I claim:

1. A process for measuring water contents of solid or liquid bodies, consisting in introducing a measured quantity of test material into an airtightly closed space, heating said space to a constant temperature, and measuring after a certain time the augmentation of the gas and steam volume contained in said space.

2. A process for measuring water contents of solid or liquid bodies as claimed in claim 1, wherein the temperature is made so high that the generated steam is superheated.

3. A process for measuring water contents of solid or liquid bodies as claimed in claim 1, wherein vacuum is produced in the measuring space in the beginning of the measurement.

In witness whereof I affix my signature.

ERICH MITTELSTEINER.